(12) United States Patent
Safford

(10) Patent No.: US 10,624,323 B2
(45) Date of Patent: Apr. 21, 2020

(54) ILLUMINATED FISHING LURE

(71) Applicant: James Safford, College Park, GA (US)

(72) Inventor: James Safford, College Park, GA (US)

( * ) Notice: Subject to any disclaimer, the term of this patent is extended or adjusted under 35 U.S.C. 154(b) by 545 days.

(21) Appl. No.: 15/292,134

(22) Filed: Oct. 13, 2016

(65) Prior Publication Data

US 2018/0103623 A1     Apr. 19, 2018

(51) Int. Cl.
*A01K 85/01*     (2006.01)
*A01K 97/02*     (2006.01)

(52) U.S. Cl.
CPC .............. *A01K 85/01* (2013.01); *A01K 97/02* (2013.01)

(58) Field of Classification Search
CPC ................................ A01K 85/01; A01K 97/02
USPC .................................................. 43/17.5, 17.6
See application file for complete search history.

(56) References Cited

U.S. PATENT DOCUMENTS

| | | | | |
|---|---|---|---|---|
| 2,898,698 A * | 8/1959 | Bair ....................... | A01K 85/01 | 43/113 |
| 3,079,721 A * | 3/1963 | Smith .................... | A01K 85/01 | 43/17.5 |
| 3,091,882 A * | 6/1963 | Dudley .................. | A01K 97/04 | 43/17.5 |
| 3,177,604 A * | 4/1965 | Ewing .................... | A01K 85/01 | 43/17.5 |
| 3,510,978 A * | 5/1970 | Murdock ............... | A01K 75/02 | 43/17.1 |
| 3,680,245 A * | 8/1972 | Brooks ................... | A01K 79/02 | 43/17.1 |
| 4,020,580 A * | 5/1977 | Chappell ................ | A01K 85/01 | 43/17.5 |
| 4,462,180 A * | 7/1984 | Scott ...................... | A01K 97/05 | 261/121.2 |
| 4,475,301 A * | 10/1984 | Wortham ............... | A01K 97/04 | 43/17.5 |
| 4,697,374 A | 10/1987 | Simms | | |
| 4,757,631 A * | 7/1988 | Anson-Smith ......... | A01K 79/02 | 43/17.5 |
| 5,133,145 A * | 7/1992 | McDonald ............. | A01K 63/006 | 362/258 |
| 5,184,414 A * | 2/1993 | Downs ................... | A01K 75/02 | 43/17.5 |
| 5,190,366 A * | 3/1993 | World .................... | A01K 85/01 | 362/234 |
| 5,651,209 A | 7/1997 | Rainey | | |
| 5,815,980 A * | 10/1998 | Clarke, Jr. ............. | A01M 1/04 | 43/113 |
| 5,819,465 A * | 10/1998 | Bryant ................... | A01K 91/10 | 43/16 |
| 6,203,170 B1 | 3/2001 | Patrick et al. | | |
| 6,820,364 B1 * | 11/2004 | Tyson .................... | A01K 97/04 | 220/735 |
| 7,195,368 B2 | 3/2007 | Heath, II | | |

(Continued)

*Primary Examiner* — Darren W Ark
*Assistant Examiner* — Brady W Frazier
(74) *Attorney, Agent, or Firm* — Thomas Horstemeyer, LLP

(57) ABSTRACT

The disclosed fish luring device includes a transparent container having an opening at a top and a bottom section, an illumination assembly, a plurality of screened caps for covering at least one opening of transparent container and a bait adapted to attract towards the illumination assembly. Further, the illumination assembly is configured to provide a green spectrum for the screening of the bait inside the transparent container.

3 Claims, 2 Drawing Sheets

(56) References Cited

U.S. PATENT DOCUMENTS

Figure 1:
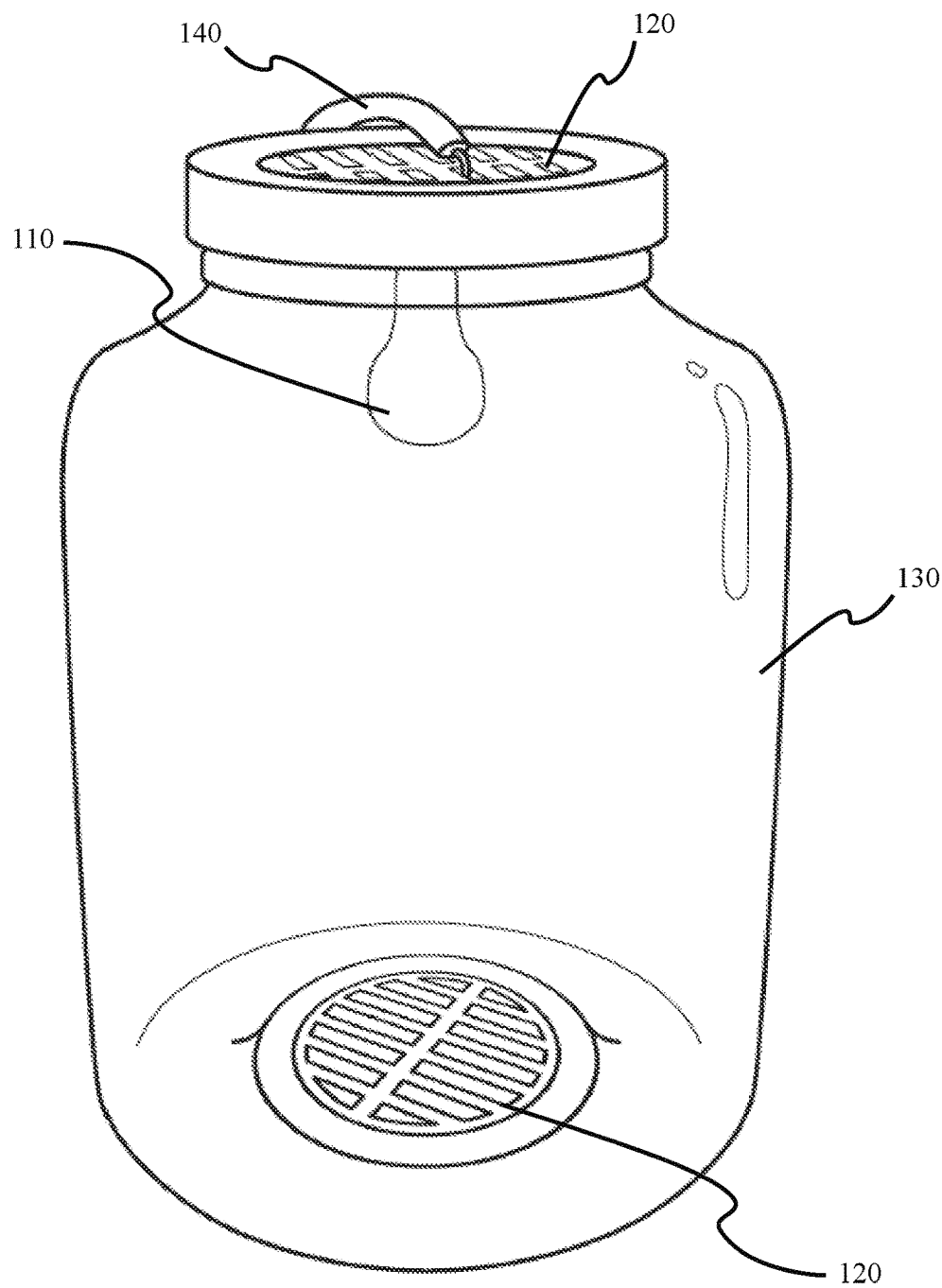

| | | | | |
|---|---|---|---|---|
| 7,225,583 B1* | 6/2007 | Stacy | ...................... | A01K 85/01 43/17.5 |
| 2015/0257375 A1* | 9/2015 | Byrd | ...................... | A01K 93/00 43/17 |
| 2015/0282469 A1* | 10/2015 | Fizer | ...................... | G01L 5/047 43/17 |
| 2016/0000055 A1* | 1/2016 | Best | ...................... | A01K 69/10 43/17.5 |

* cited by examiner

ILLUMINATED FISHING LURE

CROSS-REFERENCE TO RELATED APPLICATIONS

This application claims benefit of U.S. Provisional Patent Application No. 62/360,688, filed Jul. 11, 2016.

FIELD

Disclosed herein is a new and unique fish luring device including an illumination means. The illumination means produces light at a specific intensity, frequency and wavelength, such that various colors of the spectrum may be used to initiate a bait chain.

BACKGROUND

Artificial bait or fishing lures have been used to catch fish for a long period and made from a wide variety of materials, colors, sizes, and styles. Lures are used to attract fish and convince them to bite into the attached hook. The primary purpose of fishing with a lure is to imitate as best as possible the movements of a fish's natural prey. Consequently, there is an enormous variety in the materials, colors, and shapes of fishing lures, each suited for a particular scenario, or fish. There is no such thing as "the best" lure and color combination to use, so it is good to get a variety and see what works best for the user and the fish that the user is trying to catch.

There have been a number of solutions provided for an effective composite lure for attracting fish by different means forming part of the composite lure and few of them have been discussed below:

U.S. Pat. No. 5,651,209 A discloses a fish attractor in the form of a bottom dwelling or floating but anchored light including, optionally, a surface which provides for scintillating light effect as the device floats or moves in response to the waves. Optionally, the invention includes a fish, bait or scent dispenser for gradually dispensing a fish attracting chemical into the waters surrounding the light.

U.S. Pat. No. 4,697,374 A relates to a bioluminescent simulator for use as an underwater attractant for aquatic creatures, such as fish and crab, is in the form of a power supply, monostable multi-vibrator, and a green light-emitting diode, all potted in a clear acrylic epoxy potting material with an on/off power supply switch constituting a pair of spaced-apart conductive lugs extending out of the potted housing. The housing is waterproof and the lugs permit power to be supplied from the power supply to the light source when a conductive switching bar is slipped over the lugs and tightened them. The switching bar has on tie-on rings on the opposite ends to permit the simulator to be tied to a fishing line, crab pot, or the like.

U.S. Pat. No. 6,203,170 B1 describes a device for attracting and/or repelling fish comprising an array of visible light emitting diodes encased in a water resistant, protective housing which is substantially transparent to the visible light emitted by the diodes. In one preferred embodiment, a cylindrical housing containing the diode array is attached to a float, on the upper surface of which is provided a photovoltaic module which charges a battery located in a lower portion of the housing. In other preferred embodiments, the device is adapted to be submerged below the surface of a body of water and is connected to a remote power supply. The device is preferably used to attract fish, with the diodes emitting visible light in the green, blue and violet regions of the visible spectrum.

U.S. Pat. No. 7,195,368 B2 describes an apparatus for attracting fish, including a light source for emitting a green light. The light source is disposed within an enclosure which is removably attached to a rigid structure at a predetermined distance above a water surface and includes a diffuser capable of passing the emitted light there through. The light source is electrically connected to a power source capable of supplying 120 volts AC. A Control switch disposed intermediate the light source and the power source selectively controls supply and termination of the voltage to the light source. The emitted light penetrates the diffuser and the water surface and is transmitted to a predetermined distance below the surface of water.

The aforesaid documents and other similar solutions may strive to provide a fish lure device; however, they still have a number of limitations and shortcomings such as, but not limited to, incapable to create a bait chain via a green spectrum. Further, the use of vented screen caps at the opening of the container for the water streaming are not included in the prior art. The above mentioned prior arts can only perform certain aspects say for example, provides a fish luring device having a tackle box or a container. In general, these methods involve intercepting the stream of water with a bait, but without any screening of the bait.

Accordingly, there remains a need in the prior art to have an improved fish luring device with a fish attracting light spectrum, and a screened cap at the opening of the container, primarily used to create a bait chain, which provides the movement of the bait with the stream of water, and which procures an easy arrangement to attract a fish by the illumination means, therefore overcome the aforesaid problem and shortcomings.

SUMMARY

In the view of the foregoing disadvantages inherent in the known types of fish luring device now present in the prior art, the present invention provides an improved fish luring device having an illumination assembly. As such, the general purpose of the present invention, which will be described subsequently in greater detail, is to provide a new and improved fish luring device having an illumination assembly that produces a green spectrum to their surroundings, which has all the advantages of the prior art and none of the disadvantages.

An object of the invention is to provide a fish luring device having a transparent container, an illumination assembly, a plurality of screened caps for covering at least one opening of the transparent container and a bait adapted to attract towards the illumination assembly.

It is another object of the present invention to provide the illumination assembly that includes a green magnet light, a wire and a battery.

It is another object of the present invention to provide the illumination assembly which is configured to provide a green spectrum for the screening of the bait inside the transparent container.

It is another object of the present invention to provide the fish luring device that includes the transparent container having a top section, a bottom section, an outer surface and an inner surface.

It is another object of the present invention to provide the transparent container, i.e. open at the top section and the bottom section to let the bait gathers inside the container, and further, the vented bottom section has weight to help the device sink and keep it steady in running water.

It is another object of the present invention to provide the fish luring device in which the trawling process is very simple and further, the device is durable in construction, and at the same time very economical to produce.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

Figure 2:
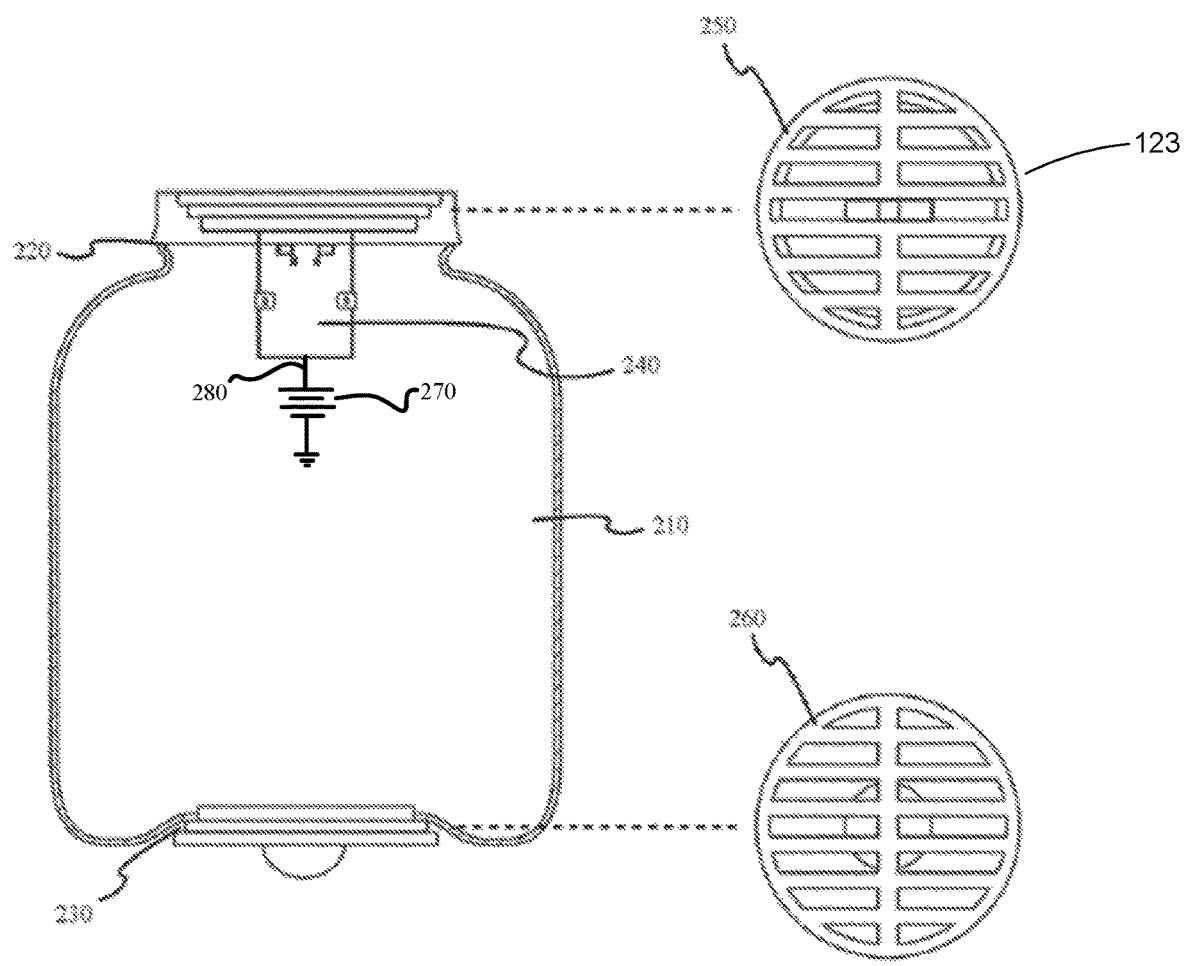

FIG. 1 is a perspective view of a fish luring device in accordance with an embodiment of the invention; and FIG. 2 illustrates a cutaway view of a transparent container and screened caps for an exemplary fish luring device in accordance with the invention.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, a fish luring device includes a transparent container, an illumination means, screened caps, an electrical wire and a battery. The transparent container comprises a generally cylindrical body having openings at opposing ends. For explanation, the positioning of the opposing openings will be identified herein as "top" and "bottom" openings. However, those of ordinary skill in the art will appreciate that the geometric shape and dimensions of the body, and openings may be modified without departing from the scope of the invention. For example, a rectangular body with variously positioned openings is contemplated, along with any number of other configurations.

In various embodiments, the top and bottom openings include screened or vented removable caps. The fish luring device further includes an illumination means, which is positioned within the body of the transparent container. The illumination means may comprise any number of known illumination sources, capable of generating and dispersing electromagnetic radiation across a number of wavelengths.

Systems and methods are described relative to the corresponding figures. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

FIG. 1 is a perspective view of a fish luring device in accordance with an embodiment of the invention. In various embodiments, the fish luring device 100 includes a transparent container 130 with at least one opening that is covered by a screened cap 120. The screened cap 120 is configured to fit over an opening within the transparent container 130 for allowing a free-flow of water within the transparent container 130. In various embodiments, the screened cap 120 may be a removable screened or a vented cap.

In accordance with various embodiments, the fish luring device 100 includes an illumination means 110 for providing lighting, (i.e. a green magnet light source). The illumination means 110 is attached to the inner side of the screened cap 120 by any means known in the art and is powered by way of an electric wire, positioned at the top opening of the transparent container 130. Further, the illumination means 110 may receive electrical current from a battery (not shown). The battery may be located with the screened cap 120 by way of an insulated electric wire 140, which may pass through an opening in the screened cap 120 so as to freely suspend the illumination means 110 within the transparent container 130, as shown in FIG. 1.

FIG. 2 illustrates a cutaway view of a transparent container and screened caps for an exemplary fish luring device in accordance with the invention. In various embodiments, the fish luring device 200 includes a transparent container 210 having a top opening 220 and a bottom opening 230, an illumination assembly 240, and a screened cap 250 for covering at least one of the top opening 220 and the bottom opening 230. In various embodiments, the transparent container 210 includes a bait for attracting fish toward the illumination assembly 240. Those of ordinary skill in the art will appreciate that a number of effective baiting devices and substances are known and may include, for example, a zooplankton and minnows.

In various embodiments, a first screened cap 250 is fitted to the top opening 220 and includes a mesh of many small openings for screening larger objects and animals from passing either into or out of the transparent container 210. The screened cap 250 includes a means for securing the illumination assembly 240. More specifically, the screened cap 250 is configured to allow free passage of water, while ensuring that the bait remains inside the transparent container 210. Scents that may be naturally released from a selected bait may pass into open water by way of the screen cap 250, for example, in order to lure fish closer to the illumination assembly 240. The illumination assembly 240 may include a green magnet light or any other illumination type that is known for effectively attracting fish. Other illumination types include, for example, LED, a gaseous light, a phosphors gaseous light, and the like.

The illumination assembly 240 receives electrical current from a battery source 270, which transports current to the illumination assembly 240 by way of an insulated electrical wire 280 or circuit.

In various embodiments, the transparent container 210 may be manufactured of a rigid and durable plastic or glass. The shape of the transparent container 210 may be cylindrical in various embodiments, although any other suitable shape may be implemented without departing from the scope of the invention.

In various embodiments, a second screened cap 260 is fitted to the bottom opening 230. The screened cap 260 for use on the bottom opening may be of a similar or different configuration than the screened cap 250 that is fitted to the top opening. The screened cap 260 includes a series of smaller opening for venting the transparent container 210. The screened cap 260 may be removable by way of threading or any other means known in the art. Moreover, the screened cap 260 may be weighted, such that it counters the buoyancy of the fish luring device 200 and allows the device to sink to the bottom of a water body.

Those of ordinary skill in the art will appreciate that details disclosed herein relating to geometries, materials, and general appearance may be modified without departing from the scope of the invention. For example, for explanation, a delineation has been drawn between the vented cap 250 and the screened cap 260. However, use of one or the other may be a matter of choice or a configuration may be selected in response to specific attributes relating to use. Moreover, uses for the disclosed fish luring device 200 may extend beyond what has been disclosed herein and such uses have been contemplated.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

It is to be understood that the above description is intended to be illustrative, and not restrictive. For example, the above-discussed embodiments may be used in combination with each other. Many other embodiments will be apparent to those of skill in the art upon reviewing the above description.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fish luring device, comprising:
   a transparent container including a top opening and a bottom opening, the transparent container being constructed of a transparent and rigid plastic;
   a lighting source configured to illuminate said transparent container with green light;
   an insulated electrical wire;
   a battery configured to supply electrical current to said lighting source through said insulated electrical wire;
   a top screened cap removably attached to said transparent container, said top screened cap covering said top opening of said transparent container, said top screened cap comprising a plurality of top slots that allow water to flow through said transparent container via said top screened cap while preventing bait within said transparent container from escaping said transparent container; and
   a bottom screened cap removably attached to said transparent container, said bottom screened cap covering said bottom opening of said transparent container, said bottom screened cap comprising a plurality of bottom slots that allow the water to flow through said transparent container via said bottom screened cap while preventing the bait within said transparent container from escaping said transparent container, said bottom screened cap comprising a weight to counter buoyancy of said transparent container;
   wherein said insulated wire passes through at least one of said top slots of said top screened cap and freely suspends said lighting source such that said lighting source is located at said top opening of said transparent container below said top screened cap.

2. A fish luring device, comprising:
   a transparent container having a top opening and a bottom opening;

a top screened cap removably attached to said transparent container, said top screened cap covering said top opening of said transparent container, said top screened cap comprising a plurality of top slots that allow water to flow through said transparent container via said top screened cap while preventing bait within said transparent container from escaping said transparent container;

a bottom screened cap removably attached to said transparent container, said bottom screened cap covering said bottom opening of said transparent container, said bottom screened cap comprising a plurality of bottom slots that allow the water to flow through said transparent container via said bottom screened cap while preventing the bait within said transparent container from escaping said transparent container, said bottom screened cap comprising a weight to counter buoyancy of said transparent container;

a lighting source; and an electrical wire configured to provide electrical current from a battery to said lighting source, wherein said electrical wire passes through at least one of said top slots of said top screened cap and suspends said lighting source such that said lighting source is located at said top opening of said transparent container below said top screened cap.

3. The fish luring device according to claim 2, wherein said lighting source comprise at least one of an LED light, a gaseous light, a phosphors light, or a combination thereof.

\* \* \* \* \*